United States Patent [19]
Bartlett

[11] Patent Number: 5,600,217
[45] Date of Patent: Feb. 4, 1997

[54] CMOS DISK DRIVE MOTOR CONTROL CIRCUIT HAVING BACK-EMF REGULATOR CIRCUITRY

[75] Inventor: Donald M. Bartlett, Fort Collins, Colo.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 343,275

[22] Filed: Nov. 22, 1994

Related U.S. Application Data

[63] Continuation of Ser. No. 131,827, Oct. 5, 1993, abandoned.

[51] Int. Cl.⁶ .................................................. H02P 3/00
[52] U.S. Cl. ............................ 318/434; 318/368; 360/75; 360/105
[58] Field of Search ................ 360/69, 75, 104–105, 360/74.1; 318/560–567, 590–591, 625–626, 685, 687, 135, 139, 159, 430, 434, 445–446, 449, 466, 478, 470, 476, 254, 138, 439, 364–377; 361/23, 33, 91, 111, 53–57; 363/50–58; 323/220, 223–226, 229–231, 265–266, 273–276, 282–285, 299, 303, 311

[56] References Cited

U.S. PATENT DOCUMENTS

| | | | |
|---|---|---|---|
| 4,086,659 | 4/1978 | Cizmic et al. | 364/900 |
| 4,237,501 | 12/1980 | Barmache et al. | 360/75 |
| 4,438,377 | 3/1984 | Sakai et al. | 318/254 |
| 4,481,449 | 11/1984 | Rodal | 318/375 |
| 4,679,102 | 7/1987 | Wevers et al. | 360/75 |
| 4,767,970 | 8/1988 | Rodal | 318/375 |
| 4,786,995 | 11/1988 | Stupeck et al. | 360/75 |
| 4,831,469 | 5/1989 | Hanson et al. | 360/75 |
| 4,839,754 | 6/1989 | Gami et al. | 360/73.01 |
| 4,866,554 | 9/1989 | Stupeck et al. | 360/105 |
| 5,091,680 | 2/1992 | Palm | 318/368 |
| 5,117,314 | 5/1992 | Bathaee et al. | 360/51 |

*Primary Examiner*—David S. Martin
*Attorney, Agent, or Firm*—David K. Lucente; Paul W. Martin

[57] ABSTRACT

A CMOS disk drive motor control circuit which has back-EMF regulator circuitry which prevents the back-EMF from the disk drive motor from exceeding a predetermined level. The back-EMF provides an alternate power source for parking the read/write head when power is removed from the disk drive. The circuit is fabricated as a single CMOS integrated circuit which is coupled between a power supply and the disk drive motor. The disk drive control circuit also includes a blocking diode through which power from the power supply flows to the motor and which prevents dissipation of a back-EMF from the motor when power is removed from the motor, and disk drive head parking circuitry which uses the back-EMF to retract and park the disk drive head.

8 Claims, 1 Drawing Sheet

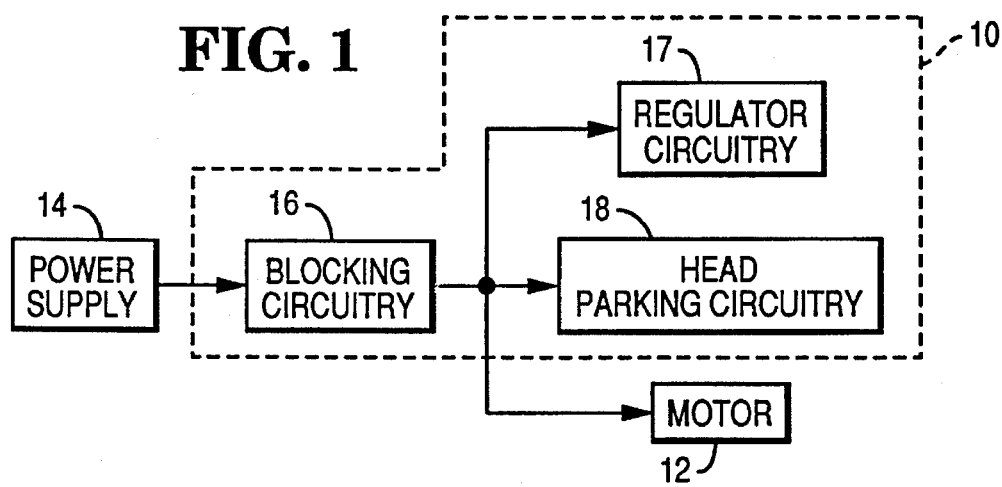
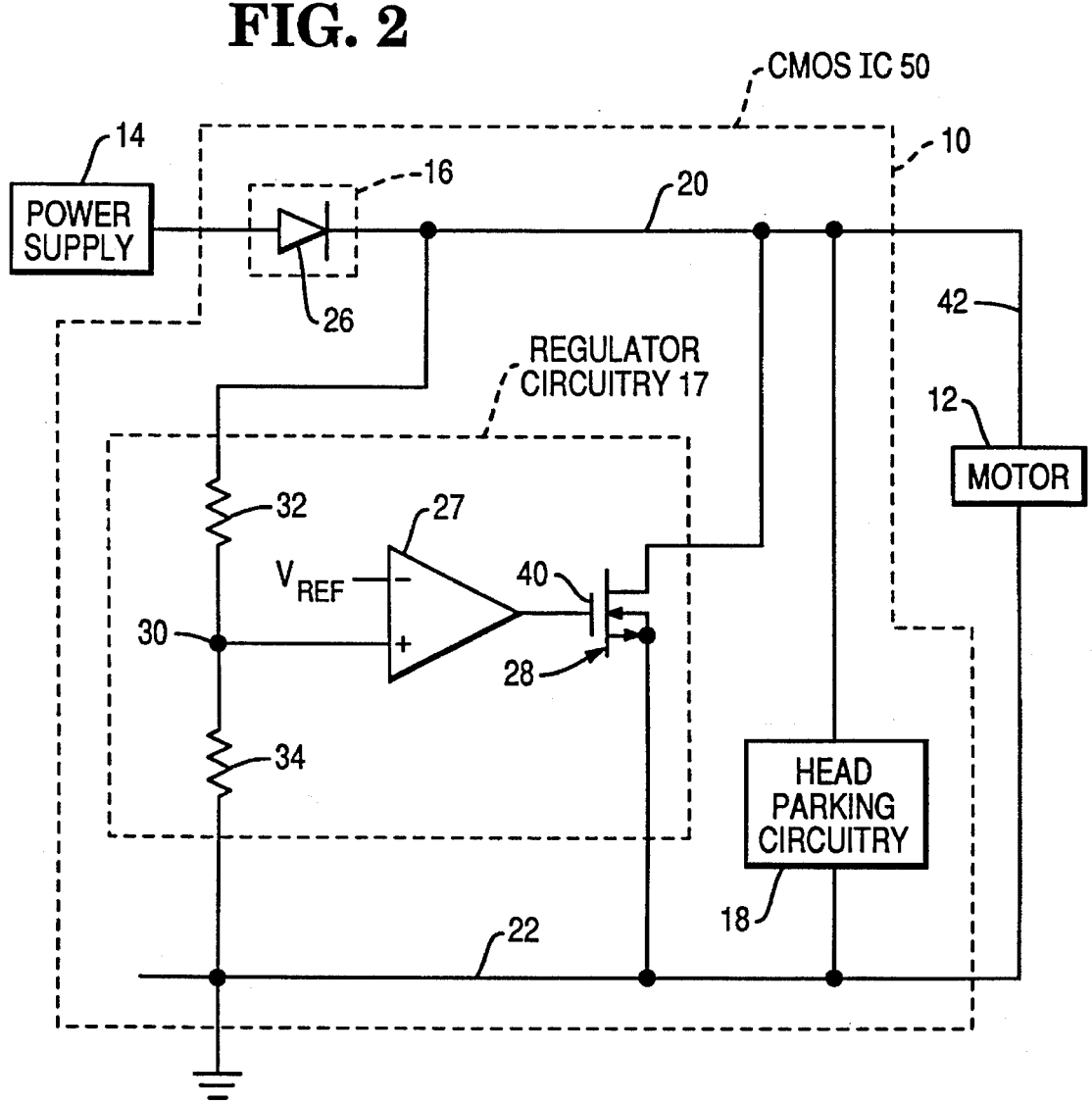

CMOS DISK DRIVE MOTOR CONTROL CIRCUIT HAVING BACK-EMF REGULATOR CIRCUITRY

This is a continuation of application(s) Ser. No. 08/131,827 filed on Oct. 5, 1993 now abandoned.

CROSS REFERENCE TO RELATED APPLICATION

The present invention is related to commonly assigned and co-pending U.S. Patent Application entitled "CMOS Disk Drive Motor Control Circuit Having Back-EMF Blocking Circuitry" and having Ser. No. 131,822.

BACKGROUND OF THE INVENTION

The present invention relates to disk drive control circuits, and more specifically to a CMOS disk drive control having a back-EMF regulator circuit.

During the power down operation of a disk drive, it is desirable to move the recording or pick up head off the storage medium to minimize damage to the head and the medium, and to minimize friction between the head and the medium when power is reapplied to the disk drive.

Since power is not available from the main power supply, an alternate power source must be made available to retract the head. A typical alternate power source is provided by the back electromotive force (back-EMF) of the spindle motor. Typically, a blocking diode prevents power from the spindle motor from being dissipated through the main power supply circuitry. In addition, it has been found desirable to provide a regulator circuit to ensure that the back-EMF does not exceed a safe operating range for any of the integrated circuits (ICs) that are powered by the back-EMF. Unfortunately, these regulators are provided as discrete zener diodes or bipolar devices, which are less attractive for use in disk drive control circuits as disk drive form factors shrink.

Therefore, it would be desirable to combine a regulator circuit with other disk drive control circuitry on a standard CMOS integrated circuit chip.

SUMMARY OF THE INVENTION

In accordance with the teachings of the present invention, a CMOS disk drive control circuit having back-EMF regulator circuitry is provided. The back-EMF regulator circuitry prevents the back-EMF from the disk drive motor from exceeding a predetermined level and includes a comparison circuit which compares the back-EMF to a predetermined reference voltage, and a transistor which provides power to park the disk drive head when the back-EMF is below the predetermined reference voltage. The back-EMF provides an alternate power source for parking the read/write head when power is removed from the disk drive. The disk drive control circuit also includes a blocking diode through which power from the power supply flows to the motor and which prevents dissipation of a back-EMF from the motor when power is removed from the motor, and disk drive head parking circuitry which uses the back-EMF to retract and park the disk drive head. The control circuit is fabricated as a single CMOS integrated circuit which is coupled between a power supply and the disk drive motor.

It is accordingly an object of the present invention to provide a CMOS disk drive control circuit having back-EMF regulator circuitry.

It is another object of the present invention to provide a CMOS disk drive control circuit having back-EMF regulator circuitry, in which the back-EMF regulator circuitry may be manufactured in combination with other disk drive motor control circuit elements, including back-EMF blocking circuitry, on a standard CMOS integrated circuit.

It is another object of the present invention to provide a CMOS disk drive motor control circuit having CMOS back-EMF regulator circuitry.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 1 is a block diagram of a CMOS motor control circuit; and

FIG. 2 is a schematic diagram of a preferred embodiment of the CMOS motor control circuit of FIG. 1 employing the CMOS regulator circuitry of the present invention.

DETAILED DESCRIPTION OF THE PREFERRED EMBODIMENT

Referring now to FIG. 1, CMOS motor control circuit 10 is connected between motor 12 and power supply 14, and includes blocking circuitry 16, regulator circuitry 17, and head parking circuitry 18. Motor 12 is part of a disk drive, preferably a hard disk drive, for spinning a storage medium. Power supply 14 provides power to motor 12, as well as other control circuit components. Motor 12 provides a back-electromotive force (EMF) when deactivated. Blocking circuitry 16 prevents the back-EMF from being dissipated through power supply 14 so that it can be employed by head parking circuitry 18 as an alternate power source to retract the read/write head of the disk drive away from the storage medium. Regulator circuit 17 prevents the back-EMF from exceeding the safe operating range of head parking circuitry 18 and other components of control circuit 10.

Turning now to FIG. 2, circuit 10 is shown in more detail. System power from power supply 14 is provided through power and ground buses 20 and 22. System power is applied to regulator circuitry 17, head parking circuitry 18, and motor 12 through blocking circuitry 16.

Blocking circuitry 16 includes parasitic blocking diode 26.

Regulator circuitry 17 includes amplifier 27 and transistor 28. When power is removed, amplifier 27 monitors the feedback voltage at junction 30 of resistors 32 and 34, which is proportional to the voltage between buses 20 and 22, and compares it to a predetermined threshold voltage. Transistor 28 is preferably a field effect transistor (FET). Together, amplifier 27 and transistor 28 form a standard shunt regulator circuit.

When system power is turned "off", regulator circuitry 17 senses an increase in negative feedback (voltage at junction 30). Amplifier 27 drives gate 40 "high", thereby turning transistor 28 "on". Current shunted by transistor 28 is pulled through the low impedance of the back-EMF generating power supply (motor 12), thereby causing the voltage at rail 42 to drop. The drop in voltage on rail 42 turns transistor 28 back "off".

Parasitic blocking diode 26 blocks current flow to power supply 14 from the back-EMF and parasitic voltages in circuit 10.

Thus, the back-EMF from motor 12 is preserved and maintained at a safe level so that it may be employed by head parking circuitry 18 to retract the head from the storage medium.

Advantageously, the components of circuit 10, except for motor 12 and power supply 14, are all fabricated as part of a single CMOS integrated circuit (IC) chip 50.

Although the present invention has been described with particular reference to certain preferred embodiments thereof, variations and modifications of the present invention can be effected within the spirit and scope of the following claims.

What is claimed is:

1. In a disk drive having a disk drive head, a control circuit between a power supply and a disk drive motor comprising:
    a CMOS integrated circuit chip including (i) a regulator circuit which prevents a back-EMF, which is generated by the motor when power is removed from the motor, from exceeding a predetermined voltage whereby the back-EMF is shunted when the back-EMF exceeds the predetermined voltage; and
    (ii) a disk drive head parking circuit for retracting and parking the disk drive head, coupled to the motor and the regulator, and coupled to receive the back-EMF, whereby the back-EMF does not exceed a safe operating range of the disk drive head parking circuit.

2. The control circuit as recited in claim 1, wherein the CMOS integrated circuit further comprises a blocking diode which prevents dissipation of the back-EMF through the power supply when power from the power supply is removed from the motor.

3. The control circuit as recited in claim 1, wherein the regulator circuit comprises:
    a comparison circuit which compares the back-EMF with the predetermined voltage; and
    a transistor coupled to the comparison circuit which shunts the back-EMF when the back-EMF is above the predetermined voltage.

4. The control circuit as recited in claim 3, wherein the transistor is a field-effect transistor.

5. The control circuit as recited in claim 3, wherein the regulator circuit further comprises:
    first and second resistors coupled in series across the motor, wherein the comparison circuit samples a predetermined part of the back-EMF at the junction of the first and second resistors.

6. In a disk drive having a disk drive head, a control circuit between a power supply and a disk drive motor comprising:
    a CMOS integrated circuit chip coupled between the power supply and the motor including:
    a blocking diode through which power from the power supply flows to the motor and which prevents dissipation of a back-EMF from the motor through the power supply when power from the power supply is removed from the motor;
    a disk drive head parking circuit which uses a regulated back-EMF to retract and park the disk head; and
    a regulator circuit which prevents the back-EMF from exceeding a predetermined reference voltage including a comparison circuit which compares a predetermined proportion of the back-EMF with a predetermined threshold voltage, first and second resistors coupled in series across the motor wherein the comparison circuit samples the predetermined proportion of the back-EMF at a junction of the first and second resistors, and a field-effect transistor coupled to the comparison circuit which shunts the back-EMF when the back-EMF exceeds a predetermined voltage whereby preventing the back-EMF from exceeding a safe operating range of the disk drive head parking circuit.

7. A method for parking a disk drive head of a disk drive comprising the steps of:
    coupling a CMOS integrated circuit having a blocking diode between a disk drive motor and a power supply for the disk drive, a back-EMF regulator circuit coupled to the motor, and a disk drive head parking circuit coupled to the motor;
    removing power from the disk drive to generate a back-EMF from the disk drive motor;
    preventing the back-EMF from dissipating through the power supply by the blocking diode;
    shunting the back-EMF when the back-EMF exceeds a predetermined voltage whereby preventing the back-EMF from exceeding a safe operating range of the disk drive head parking circuit; and
    powering the disk drive head parking circuit with the back-EMF.

8. The method as recited in claim 7, wherein the step of shunting includes:
    comparing a proportion of the back-EMF with a predetermined threshold voltage.

\* \* \* \* \*